(No Model.)
H. SCHULZE-BERGE.
METHOD OF GRADUATING THERMOMETERS.
No. 398,851. Patented Mar. 5, 1889.
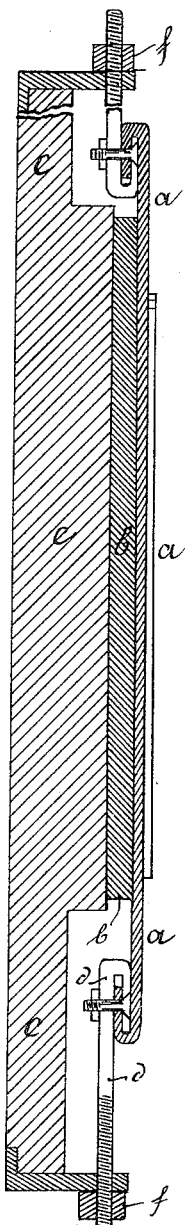
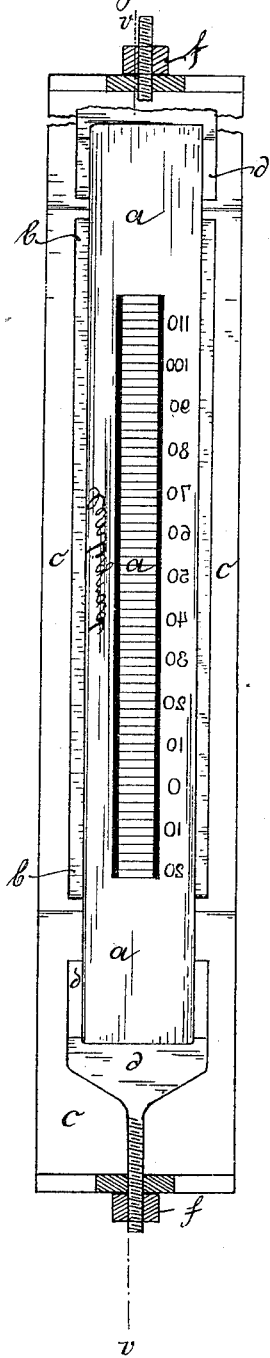
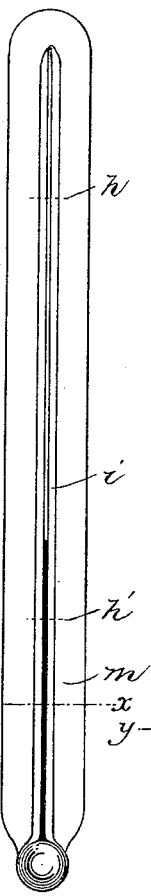
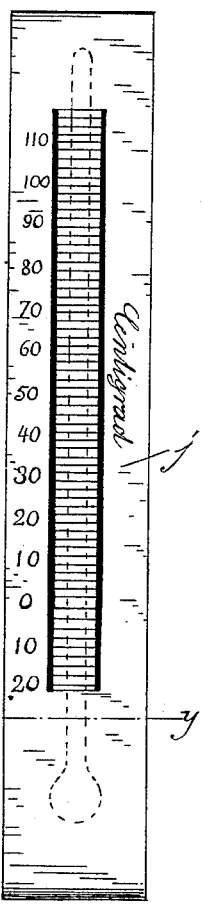
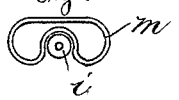
WITNESSES:
INVENTOR,

UNITED STATES PATENT OFFICE.

HERMANN SCHULZE-BERGE, OF ROCHESTER, PENNSYLVANIA.

METHOD OF GRADUATING THERMOMETERS.

SPECIFICATION forming part of Letters Patent No. 398,851, dated March 5, 1889.

Application filed March 22, 1888. Serial No. 268,071. (No model.)

*To all whom it may concern:*

Be it known that I, HERMANN SCHULZE-BERGE, a citizen of the Empire of Germany, and a resident of Rochester, Pennsylvania, have invented a new and useful Improvement in the Manufacture of Thermometers, of which the following is a specification.

My present invention relates to the manufacture of thermometers; and it consists in an improved method of graduating the same. This operation is performed at present by actual testing of the thermometer and marking two or more points thereon corresponding generally to the freezing and boiling points of water. The scale is sometimes made on a separate plate, which is suitably attached to the thermometer, or it is produced directly upon the thermometer-tube itself. The subdivisions between the two marked points on the thermometer are produced in various ways. Either a stock of separate scale-plates with various scales thereon is kept, and one of those coming nearest to the scale wanted is attached to the object, or the distance between the marked points is actually subdivided into a scale by suitable instruments and is engraved or etched in the usual way. The latter way gives a more correct subdivision, but is rather expensive, even if done by machinery. My method of manufacturing the scale for or on thermometers is applicable in each case. It differs from the methods used heretofore for such purpose in that I make use of a printing device of elastic material provided with raised marks representing the scale, which scale stretches uniformly within certain limits. It is thereby applicable to the purpose of graduating or subdividing variable distances within such limits, so that the smaller subdivisions of the scale preserve their correct relation to the entire scale.

In order that those skilled in the art to which my invention appertains may practice it and apply it to use, I will describe it with reference to the accompanying drawings, forming part of this specification, in which—

Figure 1 is a vertical longitudinal section of a marking apparatus such as I employ, the section being on the line $v\ v$ of Fig. 2. Fig. 2 is a plan view thereof. Fig. 3 is a plan view of a thermometer before it is graduated. Fig. 4 is a vertical cross-section on the line $x\ x$ of Fig. 3. Fig. 5 is a plan view of another form of thermometer and its graduated scale-plate. Fig. 6 is a vertical cross-section on the line $y\ y$ of Fig. 5.

Like symbols of reference indicate like parts in each.

Figs. 1 and 2 represent the apparatus for producing the scale, which consists in a flexible and elastic printing-pattern, $a$, bearing the marks or scale in relief. The same is supported by an elastic or yielding pad, $b$, resting upon a suitable plate or block, $e$. The printing-pattern may be provided at its ends with clamps, as indicated by the letter $d$, which clamps are connected by screw-bolts or otherwise to the plate or block $e$, so that by tightening the nut $f$ on the screw-bolts the stamp or printing-pattern is stretched and the scale elongated proportionately.

Any other equivalent stretching or fastening device may be used in place of the screw-bolts and clamps—such, for instance, as indicated in United States Patent No. 296,223, issued to me.

The operation of graduating a thermometer is performed by locating the freezing and boiling points on the article to be graduated in the usual way and then stretching or adjusting the elastic scale so that the distance between the boiling and freezing points on the scale corresponds to the length between these points on the object. The intermediate marks of the elastic scale receive a proportionate elongation by reason of the stretch, so that they preserve their relation to the boiling-point and freezing-point. When the scale has been set as thus described, an impression is taken from it either by pressing the thermometer or its scale-plate, if flat and level, upon the elastic scale, which has been provided previously with suitable ink in the usual manner, or, if the object to be graduated be tubular, it may be rolled over the scale transversely, care being taken that the marks for the freezing and boiling points located or intended to be located at a certain place on the scale come in contact with the corresponding marks on the marking-instrument. When the marking-instrument is thus applied, the whole length of the line of figures or scale-marks comes into contact with the article to be marked at the same instant, and no danger occurs of stretching the scale and thus destroying its register. The marks thus produced upon the article—consisting of subdivisions, numbers of degrees, &c.—are made permanent by any suitable process of etching, enameling, cutting, or engraving, or by other similar processes.

In Figs. 3 and 4 I show thermometers the marks of whose scale are adapted to be made on the thermometer-tube itself by the process of transverse rolling over the scale, *i* being the tube, and *m* being a guard or holder which partially incloses and protects it. *h* and *h'* represent the boiling and freezing points, which are determined before marking the thermometer.

Figs. 5 and 6 represent a thermometer which is adapted to receive the scale-marks on a scale-plate, *j*, fixed to the back of the thermometer-tube *i*. The process of marking both these styles of thermometers I have already described. Of course, when it happens that the boiling and freezing points of a number of thermometers to be marked are the same in distance from each other, the marking-instrument may be used without separate adjustment for each thermometer, one adjustment for the first thermometer marked being sufficient for the purpose.

I claim—

1. The method hereinbefore described of marking a graduated scale for measuring-instruments, which consists in locating on the article or articles to be marked two or more determined points of the scale, then adjusting lengthwise a graduated elastic printing device until the corresponding points on it are the same in distance with the said determined points on the article to be marked, and then applying the printing device to the article in such position that the determined points on the article shall register with the corresponding points on the printing device and impressing said printing device to produce upon the article the intermediate graduated marks which form the scale, substantially as and for purposes described.

2. The method hereinbefore described of marking a graduated scale for measuring-instruments, which consists in locating on a straight article which is to be marked two or more determined points of the scale, then adjusting lengthwise a graduated elastic printing device until the corresponding points on it are the same in distance with the said determined points on the article to be marked, and then applying the printing device to the article in such position that the determined points on the article shall register with the corresponding points on the printing device, and rolling the said article on the axis of its length transversely to the line of marks on the printing device, whereby the marks at the said fixed points of the printing device and the intermediate graduated marks shall be imprinted on the article simultaneously, substantially as and for the purposes described.

3. The method hereinbefore described of marking a graduated scale for measuring-instruments whose scale-marks are of variable degrees of length and are arranged in a line, which consists in locating on the article to be marked two or more determined points on the scale, and then applying thereto a printing device of elastic and flexible material which is provided with graduated printing-marks corresponding in number and relative distance to those desired to be produced on the scale, the said printing device being applied in such position that the said determined points on the article shall register with the corresponding points on the printing device, and impressing said printing device to produce upon the article the intermediate graduated marks which form the scale, substantially as and for the purposes described.

In testimony that I claim the foregoing as my invention I have signed my name, in presence of two witnesses, this 17th day of March, 1889.

HERMANN SCHULZE-BERGE.

Witnesses:
CHAS. W. HURST,
P. EGREB.